United States Patent [19]

Crisler

[11] 3,919,273
[45] Nov. 11, 1975

[54] NONAQUEOUS ACTINIDE HYDRIDE DISSOLUTION AND PRODUCTION OF ACTINIDE β-DIKETONATES

[75] Inventor: Larry R. Crisler, Arvada, Colo.

[73] Assignee: The United States of America as represented by the United States Energy Research and Development Administration, Washington, D.C.

[22] Filed: Aug. 23, 1974

[21] Appl. No.: 499,957

[52] U.S. Cl. ............... 260/429.1; 260/429.2
[51] Int. Cl.² .................................. C07F 5/00
[58] Field of Search .............. 260/429.1, 429.2

[56] References Cited
UNITED STATES PATENTS

| | | | |
|---|---|---|---|
| 2,149,856 | 3/1939 | McKone et al. | 260/429.1 |
| 2,197,498 | 4/1940 | Guthmann | 260/429.1 |
| 2,632,763 | 3/1953 | Hagemann | 260/429.1 |
| 2,989,556 | 6/1961 | Dixon et al. | 260/429.1 |
| 3,254,103 | 5/1966 | Melby et al. | 260/429.2 |
| 3,700,416 | 10/1972 | Lucid | 423/8 X |

FOREIGN PATENTS OR APPLICATIONS

| 895,676 | 5/1962 | United Kingdom | 260/429.1 |

OTHER PUBLICATIONS

Moeller et al., Journal of Inorganic and Nuclear Chemistry, Vol. 2, No. 3, Mar., 1956, pp. 164–175.

*Primary Examiner*—Benjamin R. Padgett
*Assistant Examiner*—Christine M. Nucker
*Attorney, Agent, or Firm*—Dean E. Carlson; Dudley W. King; Ignacio Resendez

[57] ABSTRACT

Actinide beta-diketonate complex molecular compounds are produced by reacting a beta-diketone compound with a hydride of the actinide material in a mixture of carbon tetrachloride and methanol.

9 Claims, No Drawings

NONAQUEOUS ACTINIDE HYDRIDE DISSOLUTION AND PRODUCTION OF ACTINIDE β-DIKETONATES

BACKGROUND OF INVENTION

The invention relates to a nonaqueous method for dissolving actinide hydrides and producing anhydrous actinide beta (β)-diketonate complex molecular compounds.

Methods for separating and recovering actinide materials from mixtures of other materials are constantly being sought. As an example it is desirable to separate plutonium from other materials and thereafter recover the plutonium, such as in recovering plutonium in the casting process of plutonium in tantalum crucibles, or in recovering plutonium from metal machining operations. Further, it is desirable to remove actinide hydrides from other metals and thus allow processing or reworking of the actinide metals with potential accident-causing handling conditions reduced. The hazardous conditions involved with working with hydrides derive from the hydride properties of large surface area per unit weight and are such as spontaneous ignition in air and high chemical reactivity potential.

Nonaqueous methods for making actinide β-diketonate complex molecular compounds are also desirable wherever the product is used in isotopic separation by way of volatile methods, chemical vapor deposition processes and other like processes.

Thus a method for reacting and recovering actinide materials from a mixture of materials would find ready application in industrial manufacturing and recovery processes where these mixtures may be found.

SUMMARY OF INVENTION

In view of the above, it is an object of this invention to provide a method for dissolving actinide hydrides.

It is a further object of this invention to provide a novel method for forming actinide β-diketonate complex molecular compounds from actinide hydrides.

It is a further object of this invention to provide an improved method for recovering actinide materials from mixtures of materials containing actinide hydride wherein the mixture is contacted with a suitable β-diketone compound in a mixture of carbon tetrachloride ($CCl_4$) and anhydrous methanol ($CH_3OH$) to react with an actinide hydride and form an actinide (β-diketonate) complex molecular compound.

It is a further object of this invention to provide a novel non-aqueous method for forming plutonium (IV) β-diketonate complex molecular compounds from plutonium hydrides.

It is a further object of this invention to provide a method for removing actinide hydrides from other metals which do not form hydrides by selectively reacting the hydrides with a β-diketone compound to form an actinide β-diketonate complex molecular compound, and separating same from the nonhydrided metals.

Various other objects and advantages will appear from the following description of this invention and the most novel features will be particularly pointed out hereinafter in connection with the appended claims. It will be understood that various changes in the details, materials and steps of the process, which are herein described and illustrated in order to explain the nature of the invention, may be effected by those skilled in the art without departing from the scope of this invention.

The invention comprises, in brief, contacting an actinide hydride with a suitable β-diketone compound (i.e., a compound containing betacarbonyl groups with at least one proton on the carbon separating the carbonyl groups, thus allowing a keto ⇌ enol tautomerism to occur, and, under appropriate conditions, the enolic proton may be removed) having the formula R'C(:O)CH₂C(:O)R'' wherein R' and R'' are alkyl, fluorinated alkyl, aromatic and/or heterocyclic groups, in a mixture of $CCl_4$ and $CH_3OH$ to effect dissolution and reaction to form an actinide β-diketonate complex molecular compound. Reaction may be aided by heating to from about 20°C to about 51°C.

DETAILED DESCRIPTION

The nonaqueous method of making actinide β-diketonate or β-ketoenolate complex molecular compounds is illustrated by equation 1 in which plutonium is used as the representative actinide hydride material and in which 2,4 pentanedione (otherwise referred to as acetylacetone or HAcAc) is the representative β-diketone compound.

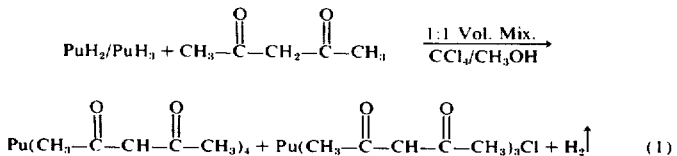

(1)

In equation 1, tetrakis(2,4-pentanedionato)-plutonium (IV) (for convenience referred to hereinafter as Pu(AcAc)₄) comprises about 95 percent of the reaction products and the product tris(2,4-pentanedionatol)-plutonium (IV) chloride is found in amounts such as about 5 percent. Hydrogen evolves as a gas in this reaction and may be recovered or captured, if such is desired. The resulting product may be purified by subliming the Pu(AcAc)₄ at a temperature of from about 135°C to about 180°C until sublimation is complete. The sublimed Pu(AcAc)₄ may have greater than about 95 percent purity and does not contain water since the method of preparation was nonaqueous. The pressure for sublimation may be at from about $10^{-4}$ to about $10^{-6}$ torr.

An alternate method for purifying the Pu(AcAc)₄ product in equation 1 may comprise such as dissolving the Pu(AcAc)₄ product in an anhydrous organic solvent such as chloroform, dichloromethane, or benzene and removing the nonsoluble material by filtration. The Pu(AcAc)₄ will remain in the organic solvent which may thereafter be removed by evaporation, such as at a temperature of from about 20°C to about 80°C, and at a pressure of from about 20 to about 760 torr to yield Pu(AcAc)₄ having a purity greater than about 95 percent. It should be understood that various other actinide materials as well as other β-diketone compounds perform in the same manner, such as uranium and thorium, which when reacted with HAcAc would likewise yield tetrakis(2,4-pentanedionato)uranium (IV) or tetrakis(2,4-pentanedionato)thorium (IV) product, respectively.

The equations used herein are believed to accurately represent the reactions occurring although exact stoichiometric quantities have not been verified. The products have all been verified by mass spectral analysis.

EXAMPLE I

Five grams of plutonium hydride is placed in a one to one volume mixture of $CCl_4$ and $CH_3OH$ (10 milliliters (ml) of each) and, after 40 minutes, there is no reaction. A β-diketone compound, HAcAc, is at this point added in a volume quantity of about 5 ml. A reaction is observed in place after about 2 minutes with hydrogen being evolved. The solution turns from a clear color to a red brown color. Analysis of the products verified those shown in equation 1. Dissolution and the reaction were complete after about 16 hours.

EXAMPLE II

One application of this invention is that of separating plutonium from other materials such as the tantalum crucibles in which plutonium metal may be cast. After comminuting the mixture of the plutonium and tantalum, the mixture may be hydrided through processes known in the art, such as by passing hydrogen at a temperature of from about 25°C to about 100°C and at a pressure of from about 150 to about 450 millimeters of mercury through the mixture to form plutonium hydride and nonhydrided material. This mixture is then contacted with sufficient, and preferably an excess of a suitable β-diketone compound such as HAcAc to assure reaction of all of the plutonium hydride and formation of $Pu(AcAc)_4$ product. The amount of β-diketone compound to be added may be determined from stoichiometric considerations. This product may then be purified by subliming at a temperature of about 135°C and a pressure of about $10^{-4}$ torr to form the pure $Pu(AcAc)_4$ or, in an alternate purification method, the products of the previous reaction may be dissolved in a suitable organic solvent such as chloroform, dichloromethane, or benzene, and the $Pu(AcAc)_4$ which is in solution may be separated from insoluble materials by filtration. The solvent may then be removed by evaporation at a temperature of from about 20°C to about 80°C and, if desired, at a reduced pressure such as from about 20 to about 760 torr to aid evaporation to form $Pu(AcAc)_4$ of greater than about 95 percent purity.

Nonaqueous plutonium (IV) β-diketonate complex molecular compounds, as well as other actinide β-ketoenolate or β-diketonate complex molecular compounds formed by this process are useful in such processes as isotopic separation or enrichment by means of volatile techniques, chemical vapor deposition of oxide or metallic films, organic solvent soluble compounds for nonaqueous, electrochemical and associated processes, and the like. For these, anhydrous compounds generally perform more adequately than hydrated compounds because of increased solubility in organic solvents and improved volatility process properties.

Other β-diketones which could be used are such as 2-thenoyltrifluoroacetone and 1,1,1,2,2,3,3-heptafluoro-7,7-dimethyl-4,6-octanedione.

Any actinide hydrides satisfactorily react. For example, plutonium hydrides as herein referred to may be either plutonium dihydride or plutonium trihydride. Although a one to one volume mixture of $CCl_4/CH_3OH$ is used and referred to herein, the ratio may be changed from about 0.1 to about 9 parts by volume of $CCl_4$ to 1 part by volume $CH_3OH$. Further, other materials could be useable in lieu of $CCl_4$ portion are such as bromotrichloromethane, and trichloroacetonitrile. Other materials which could be used in lieu of $CH_3OH$ are such as ethanol and isopropyl alcohol. Other solvents such as benzene may be used if it is desired that no chloride ligand substitution occur in the product β-diketonate complex molecular compound.

The hydrides of plutonium may be reacted with a suitable β-diketone compound in a mixture of $CCl_4/CH_3OH$ (within the range described hereinabove) to yield a nonaqueous product which may include plutonium β-diketonate)$_4$ primarily and which may be purified with ease. The process is useful for removing plutonium and other actinide materials such as uranium from mixtures of materials which do not react with a β-diketone compound and also for forming volatile compounds useful in industrial and research processes.

Actinide series elements as discussed herein include elements 89 through 103 in the periodic table of the elements, as given in the *Handbook of Chemistry and Physics*, 54th Edition, 1973, CRC Press, Cleveland, Ohio.

What is claimed is:

1. A nonaqueous method of dissolving actinide metal hydrides and forming anhydrous actinide metal β-diketonate complex molecular compounds comprising mixing an organic solvent selected from the group consisting of carbon tetrachloride, bromotrichloromethane, and trichloroacetonitrile, with an alcohol selected from the group consisting of ethanol, methanol and isopropanol to form a mixture, adding a β-diketone compound to said mixture, and thereafter contacting actinide metal hydride with said mixture to dissolve said hydride and form actinide metal β-diketonate complex molecular compound.

2. The method of claim 1 wherein said organic solvent is carbon tetrachloride, said alcohol is methanol, and said mixture comprises from about 0.1 to about 9 parts by volume of carbon tetrachloride to one part by volume methanol.

3. The method of claim 1 wherein said β-diketone compound is selected from the group consisting of 2,4 pentanedione; 1,1,1,2,2,3,3-heptafluoro-7,7-dimethyl-4,6-octanedione; and 2-thenoyltrifluoroacetone.

4. The method of claim 1 wherein said actinide metal hydride is plutonium hydride, and said actinide metal β-diketonate complex molecular compound is tetrakis-(2,4-pentanedionato)plutonium (IV).

5. The method of claim 4 including the further step of purifying said tetrakis(2,4-pentanedionato)-plutonium (IV) by evacuating an atmosphere about said tetrakis(2,4-pentanedionato)plutonium (IV) to a pressure of from about $10^{-4}$ torr to about $10^{-6}$ torr, heating said tetrakis(2,4-pentanedionato)plutonium (IV) in said evacuated state to a temperature of from about 135°C to about 200°C thereby subliming and purifying said tetrakis(2,4-pentanedionato)plutonium (IV) complex molecular compound.

6. The method of claim 1 including the further step of purifying said actinide metal β-diketonate complex molecular compound by dissolving said actinide metal β-diketonate in an organic solvent selected from the group consisting of chloroform, dichloromethane, and benzene, thereby forming a solution, separating insoluble material from said solution, heating said solution to from about 20°C to about 80°C at a pressure of from about 20 to about 760 torr to evaporate said organic solvent yielding actinide metal β-diketonate complex molecular compound having greater than about 95 percent purity.

7. The method of claim 1 wherein said actinide hydride is plutonium hydride, said β-diketone compound is 2,4-pentanedione, said organic solvent is carbon tetrachloride, said alcohol is methanol, and the volume ratio of carbon tetrachloride to methanol is one to one.

8. The method of claim 1 wherein said β-diketone compound has the formula $R'C(:O)CH_2C(:O)R''$, and $R'$ and $R''$ are selected from the group consisting of an alkyl group, a fluorinated alkyl group, an aromatic group, a heterocyclic group, and mixtures thereof.

9. The process of claim 1 wherein said actinide hydride is selected from the group consisting of plutonium hydride, uranium hydride and thorium hydride.

* * * * *